United States Patent
Kobayashi et al.

(12)

(10) Patent No.: US 6,812,288 B2
(45) Date of Patent: Nov. 2, 2004

(54) RUBBER COMPOSITION, VIBRATION-ISOLATING RUBBER AND VIBRATION-ISOLATING MOUNT

(75) Inventors: Naokazu Kobayashi, Mie (JP); Toshihiro Tadaki, Mie (JP); Keisuke Tsukimawashi, Mie (JP)

(73) Assignee: JSR Corporation, Tokyo (JP)

(*) Notice: Subject to any disclaimer, the term of this patent is extended or adjusted under 35 U.S.C. 154(b) by 0 days.

(21) Appl. No.: 10/329,536

(22) Filed: Dec. 27, 2002

(65) Prior Publication Data

US 2003/0130402 A1 Jul. 10, 2003

(30) Foreign Application Priority Data

Dec. 28, 2001 (JP) ........................................ 2001-402029

(51) Int. Cl.[7] .......................... C08L 9/00; C08L 33/02; C08L 37/00; C08L 41/00; C08L 43/00
(52) U.S. Cl. ........................ 525/201; 525/208; 525/209; 525/217; 525/232; 525/241
(58) Field of Search ................................ 525/201, 208, 525/209, 217, 232, 241

(56) References Cited

U.S. PATENT DOCUMENTS

| 5,047,483 A | * | 9/1991 | Halasa et al. ................ 525/237 |
| 5,432,232 A | * | 7/1995 | Hattori et al. ................. 525/99 |
| 6,114,451 A | * | 9/2000 | Shoda et al. ................. 525/191 |
| 6,293,325 B1 |  | 9/2001 | Hsu et al. |
| 6,390,163 B1 | * | 5/2002 | Duddey .................... 152/209.1 |

FOREIGN PATENT DOCUMENTS

| EP | 1 253 170 | 10/2002 |
| JP | 7-216136 | 8/1995 |
| JP | 11-222536 | 8/1999 |
| WO | WO 02/16491 | 2/2002 |

OTHER PUBLICATIONS

Patent Abstracts of Japan, JP 57–180646, Nov. 6, 1882.
"Kogyo Zairyo (Industrial materials)", vol. 45, No. 12, p. 36, Nov. 1997 (with partial English translation).

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

The present invention provides a rubber composition that provides excellent vibration-isolating properties, a vibration isolating rubber formed from the rubber composition and a vibration-isolating mount. The rubber composition contains 5 to 40 parts by weight of a styrene-butadiene-based copolymer rubber, having a weight-average molecular weight of 200,000 or less and a glass transition temperature of −35° C. or higher; and 95 to 60 parts by weight of a diolefin-based rubber, having a weight-average molecular weight exceeding 200,000 and a glass transition temperature of −20° C. or lower; where the weight are based on 100 parts by weight of the total amount of both. A vibration-isolating rubber comprising this composition has a performance relationship between a dynamic-to-static modulus ration (Kd/Ks), which is a ratio of a dynamic spring constant (Kd) to a static spring constant (Ks), and a loss factor (tan δ), as shown by the equation (1): $Kd/Ks \leqq 20 \tan \delta - 1.8$ (1). This vibration-isolating rubber is used for a vibration-isolating mount.

20 Claims, 2 Drawing Sheets

RUBBER COMPOSITION, VIBRATION-ISOLATING RUBBER AND VIBRATION-ISOLATING MOUNT

BACKGROUND OF THE INVENTION

1. Field of the Invention

The present invention relates to a rubber composition, a vibration-isolating rubber and a vibration-isolating mount; and more specifically, the invention relates to a vibration-isolating rubber that has excellent vibration-isolating properties, not previously obtained, and a corresponding rubber composition, as well as a vibration-isolating mount comprising this vibration-isolating rubber.

2. Description of the Related Art

A vibration-isolating rubber having a low dynamic-to-static modulus ratio and a large loss factor is desired, but a vibration-isolating rubber which sufficiently satisfies such performance has not been obtained yet. In the automobile industry and the like, a vibration-isolating rubber mount encapsulating a liquid is known. This "liquid encapsulated-type" vibration-isolating rubber mount has a complicated structure, and its vibration-isolating effect shows only one direction. Furthermore, it is expensive. So a vibration-isolating rubber mount which does not encapsulate a liquid is desired. Hitherto, a vibration-isolating rubber having a low dynamic-to-static modulus ratio and high loss factor has been disclosed in JP-A-7-216136, JP-A-11-222536, and the like.

However, the performance of the disclosed vibration-isolating rubber is not superior to a liquid-encapsulated type vibration-isolating mount. That is, when the value of a loss factor is large, the value of the dynamic-to-static modulus ratio becomes large, and when the value of a dynamic-to-static modulus ratio is small, the value of the loss factor becomes small.

In addition, as described in the following paragraphs (1) to (3), it is extremely difficult to overcome a linear relationship between a loss factor and a dynamic-to-static modulus ratio by using a rubber mount encapsulating no liquid, and it is extremely difficult to realize a vibration-isolating rubber comparable to a liquid-encapsulated mount at present (see "Kogyo Zairyo (Industrial materials)", November, 1997, (Vol. 45, No. 12), page 36, left column, lines 4 to 9, same page, left column, line 26 to same page, right column, line 4, same page, right column lines 9 to 14).

(1) "It can be said that a smaller dynamic-to-static modulus ratio and a higher damping property provides high performance engine mount. However since a conventional rubber shows an almost linear relationship between the dynamic-to-static modulus ratio and the damping property as shown in FIG. 2, both properties could not be improved at the same time."

(2) "Although it is impossible to realize an excellent rubber mount comparable to a liquid-encapsulated type vibration-isolating rubber mount by itself, an efficient vibration isolating rubber mount encapsulating no liquid is a theme of development based on balance with the cost. As shown in FIG. 2, the conventional blending technique can not solve this theme."

(3) "In the past, very few polymers have been developed for a vibration-isolating rubber, and a natural rubber is dominantly used currently. It is desired to realize a polymer for the vibration-isolating rubber which optimizes a low dynamic-to-static modulus ratio and a high damping."

As mentioned above, it is desired that a vibration-isolating rubber and a vibration-isolating mount have higher performance than the abovementioned vibration-isolating rubbers.

The present invention provides a rubber composition which provides a vibration-isolating rubber, having a higher performance than that of the conventional rubbers, a vibration-isolating rubber and a vibration-isolating mount.

SUMMARY OF THE INVENTION

The present inventors have found that a high performance vibration-isolating rubber is obtained from a rubber composition comprising two or more rubbers having specific weight-average molecular weights and specific glass transition temperatures, leading to the present invention, which is based on such findings.

The present invention is based on the findings described above and can be described as follows.

[1]. A rubber composition characterized in comprising 5 to 40 parts by weight of a styrene-butadiene-based copolymer rubber (A), having a weight-average molecular weight of 200,000 or less, and a glass transition temperature of $-35°$ C. or higher, and 95 to 60 parts by weight of a diolefin-based rubber (B), having a weight-average molecular weight exceeding 200,000 and a glass transition temperature of $-20°$ C. or lower. The weights are based on 100 parts by weight of the total amount of (A) and (B).

[2]. The rubber composition according to [1] above, wherein the diolefin-based rubber (B) is at least one rubber selected from the group consisting of a styrene-butadiene copolymer rubber, a butadiene rubber, an isoprene rubber and a natural rubber.

[3]. The rubber composition according to [2] above, wherein a weight-average molecular weight of the styrene-butadiene-based copolymer rubber (A) is 500 to 80,000.

[4]. The rubber composition according to [3] above, further comprising 10 to 200 parts by weight of a filler, based on 100 parts of the total amount of the styrene-butadiene-based copolymer rubber (A) and the diolefin-based rubber (B).

[5]. The rubber composition according to [3] above, wherein the styrene-butadiene-based copolymer rubber (A) is hydrogenated at 50% or more.

[6]. The rubber composition according to [5] above, further comprising 10 to 200 parts by weight of a filler, based on 100 parts of the total amount of the styrene-butadiene-based copolymer rubber (A) and the diolefin-based rubber (B).

[7]. The rubber composition according to [2] above, wherein the diolefin-based rubber (B) is at least one rubber selected from the group consisting of a modified diolefin-based rubber having at least one functional group selected from the group consisting of amino group, alkoxysilyl group, epoxy group and hydroxyl group, and a modified diolefin-based rubber obtained by reacting a diolefin-based rubber with a tin compound or a silicon compound.

[8]. The rubber composition according to [7] above, further comprising 10 to 200 parts by weight of a filler, based on 100 parts of the total amount of the styrene-butadiene-based copolymer rubber (A) and the diolefin-based rubber (B).

[9]. A vibration-isolating rubber which is obtained by crosslinking a rubber composition comprising 5 to 40 parts by weight of a styrene-butadiene-based copolymer rubber (A), having a weight-average molecular weight of 200,000 or less and a glass transition temperature of −35° C. or higher, and 95 to 60 parts by weight of a diolefin-based rubber (B), having a weight-average molecular weight exceeding 200,000 and a glass transition temperature of −20° C. or lower; the weights based on 100 parts by weight of the total amount of (A) and (B).

[10]. The vibration-isolating rubber according to [9] above, wherein the diolefin-based rubber (B) is at least one rubber selected from the group consisting of a styrene-butadiene copolymer rubber, a butadiene rubber, an isoprene rubber and a natural rubber.

[11]. The vibration-isolating rubber according to [10] above, wherein a weight-average molecular weight of the styrene-butadiene-based copolymer rubber (A) is 500 to 80,000.

[12]. The vibration-isolating rubber according to [11] above, wherein the styrene-butadiene-based copolymer rubber (A) is hydrogenated at 50% or more.

[13]. The vibration-isolating rubber according to [12] above, wherein a relationship between a dynamic-to-static modulus ratio (Kd/Ks), which is a ratio of a dynamic spring constant (referred to also as "dynamic elasticity modulus") (Kd) and a static spring constant (referred to also as "static elasticity modulus") (Ks), and a loss factor (tan δ) is shown by the following equation (1):

$$Kd/Ks \leq 20 \tan \delta - 1.8 \qquad (1).$$

[14]. The vibration-isolating rubber according to [10] above, wherein the diolefin-based rubber (B) is at least one rubber selected from the group consisting of a modified diolefin-based rubber having at least one functional group selected from the group consisting of amino group, alkoxysilyl group, epoxy group and hydroxyl group, and a modified diolefin-based rubber obtained by reacting a diolefin-based rubber with a tin compound or a silicon compound.

[15]. The vibration-isolating rubber according to [14] above, wherein a relationship between a dynamic-to-static modulus ratio (Kd/Ks) which is a ratio of a dynamic spring constant (Kd) and a static spring constant (Ks), and a loss factor (tan δ) is shown by the following equation (1):

$$Kd/Ks \geq 20 \tan \delta - 1.8 \qquad (1).$$

[16]. A vibration-isolating mount comprising a vibration-isolating rubber which is obtained by crosslinking a rubber composition comprising 5 to 40 parts by weight of a styrene butadiene-based copolymer rubber (A), having a weight-average molecular weight of 200,000 or less and a glass transition temperature of −35° C. or higher, and 95 to 60 parts by weight of a diolefin-based rubber (B), having a weight-average molecular weight exceeding 200,000 and a glass transition temperature of −20° C. or lower; the weights based on 100 parts by weight of the total amount of (A) and (B).

[17]. The vibration-isolating mount according to [16] above, wherein the styrene-butadiene-based copolymer rubber (A) is hydrogenated at 50% or more.

[18]. The vibration-isolating mount according to [17] above, wherein a relationship between a dynamic-to-static modulus ratio (Kd/Ks), which is a ratio of a dynamic spring constant (Kd) and a static spring constant (Ks), and a loss factor (tan δ) is shown by the following equation (1):

$$Kd/Ks \geq 20 \tan \delta - 1.8 \qquad (1).$$

[19]. The vibration-isolating mount according to [18] above, wherein the diolefin-based rubber (B) is at least one rubber selected from the group consisting of a modified diolefin-based rubber having at least one functional group selected from the group consisting of amino group, alkoxysilyl group, epoxy group and hydroxyl group, and a modified diolefin-based rubber obtained by reacting a diolefin-based rubber with a tin compound or a silicon compound.

[20]. The vibration-isolating mount according to [19] above, wherein a relationship between a dynamic-to-static modulus ratio (Kd/Ks), which is a ratio of a dynamic spring constant (Kd) and a static spring constant (Ks), and a loss factor (tan δ) is shown by the following equation (1):

$$Kd/Ks \geq 20 \tan \delta - 1.8 \qquad (1).$$

As described above, it has been previously said that, even when a formulated rubber or a blending ratio is changed, the vibration-isolating performance shows a linear relationship between a dynamic-to-static modulus ratio (Kd/Ks) and a loss factor (tan δ). And as described above, it is extremely difficult to shift the relationship downwardly out of this linearity by a rubber itself, which is not a liquid-encapsulated type mount.

However, the vibration-isolating rubber of the present invention does not show such a linear relationship, but shows a wide expansion, that is, it shows an unexpected behavior and, at the same time, shows excellent properties.

In addition, the rubber composition of the present invention can provide a vibration-isolating rubber showing excellent performance which was not shown previously.

Further, the vibration-isolating mount of the present invention, which uses the vibration-isolating rubber, shows excellent vibration-isolating performance as described above, and the vibration-isolating effect can be assuredly improved. Therefore, the abovementioned vibration-isolating rubber of the present invention and the vibration-isolating mount of the present invention are widely used in the industries which use articles that produce noise; that is, the automobile industry, manufacturing industries, and the like.

DETAILED DESCRIPTION OF THE INVENTION

The invention is further detailed below.

The rubber composition of the present invention is characterized in comprising 5 to 40 parts by weight of a styrene-butadiene-based copolymer rubber (A), having a weight average molecular weight of 200,000 or less and a glass transition temperature of −35° C. or higher, and 95 to 60 parts by weight of a diolefin-based rubber (B), having a weight-average molecular weight exceeding 200,000 and a glass transition temperature of −20° C. or lower, the weights based on 100 parts by weight of the total amount of (A) and (B).

The "styrene-butadiene-based copolymer rubber (A)" (hereinafter referred to also as "component (A)") is a copolymer rubber obtained by polymerizing a styrene-based monomer and a butadiene-based monomer, or a copolymer rubber obtained by polymerizing a styrene-based monomer, a butadiene-based monomer, and if necessary, other monomers.

Examples of the styrene-based monomer include styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene and the like. Among them, styrene is preferred. These monomers can be used alone or in combination of two or more.

Examples of the butadiene-based monomer include 1,3-butadiene, 2,3-dimethyl-1,3-butadiene, 2-chloro-1,3-butadiene and the like. Among these monomers, 1,3-butadiene is preferred. These monomers can be used alone or in combination of two or more.

Examples of other monomers include isoprene, 1,3-pentadiene, chloroprene and the like. These monomers can be used alone or in combination of two or more.

Examples of the component (A) include an emulsion polymerized styrene/butadiene rubber, a solution polymerized styrene/butadiene rubber, a styrene/butadiene random copolymer rubber, a styrene butadiene tapered block copolymer, a high trans styrene/butadiene copolymer rubber, a solution polymerized styrene/isoprene/butadiene random copolymer rubber, an emulsion polymerized styrene/isoprene/butadiene random copolymer rubber, a high vinyl styrene/butadiene-low vinyl styrene/butadiene block copolymer rubber, a high vinyl butadiene/(styrene/butadiene) copolymer rubber and the like. Among them, an emulsion polymerized styrene/butadiene rubber and a solution polymerized styrene/butadiene rubber are preferable. And the component (A) can be used alone or in combination of two or more.

Weight-average molecular weight (hereinafter referred to also as "Mw") of the component (A) is 200,000 or less, preferably 500 to 100,000, more preferably 500 to 80,000, further preferably 5,000 to 60,000, and particularly 8,000 to 60,000. When Mw exceeds 200,000, there is a tendency that the vibration-isolating performance is decreased.

Glass transition temperature (hereinafter referred to also as "Tg") of the component (A) is −35° C. or higher, preferably higher than −30° C., more preferably −25° C. or higher, further preferably −20° C. or higher, particularly −20° C. to 20° C., and most preferably −20° C. to 0° C. When Tg is lower than −35° C., there is a tendency that the vibration-isolating performance is decreased.

In addition, component (A) having a prescribed Tg may be prepared according to its purpose and use.

The component (A) may be a hydrogenated copolymer rubber. The preferable hydrogenation rate is 50% or more, more preferably 70 to 99%, further preferably 80 to 99%, and particularly 85 to 95%. When the hydrogenation rate is less than 50%, a vibration performance equivalent to a non-hydrogenated (A) is shown and the cost is increased. In addition, since the hydrogenated copolymer rubber itself is not (or is difficult to be) cross-linked, it can be preferably applied even when a molecular weight becomes relatively large (about 5,000 to 80,000, preferably around 8,000 to 80,000 and the like).

The hydrogenated copolymer rubber may be used with a non-hydrogenated copolymer rubber.

The content of the styrene/butadiene copolymer rubber (A) is 5 to 40 parts by weight, preferably 10 to 35 parts by weight, and more preferably 10 to 30 parts by weight, based on 100 parts by weight of the total of the component (A) and the diolefin-based rubber (B). When the content of the component (A) is less than 5 parts by weight, there is a tendency that the vibration-isolating performance is decreased. On the other hand, when the content exceeds 40 parts by weight, there is a tendency that a the mechanical strength is deteriorated.

The "diolefin-based rubber (B)" (hereinafter referred to also as "component (B)") is a (co)polymer obtained by polymerizing a diolefin-based monomer, or a copolymer obtained by polymerizing a diolefin-based monomer and other monomers. Examples of the diolefin-based monomer include a conjugated diene-based monomer (hereinafter referred to also as "conjugated diene") such as 1,3-butadiene, 2,3-dimethyl-1,3-butadiene, 2-chloro-1,3-butadiene, 1,3-pentadiene and isoprene, and the like. Among them, 1,3-butadiene and isoprene are preferable, and 1,3-butadiene is most preferable. These diolefin-based monomers can be used alone or in combination of two or more.

Examples of other monomers include an aromatic vinyl monomer such as styrene, an olefinic unsaturated nitrile monomer such as acrylonitrile, ethylene, propylene and the like. These monomers can be used alone or in combination of two or more. Examples of the component (B) include a natural rubber, a butadiene rubber, an isoprene rubber, a styrene/butadiene copolymer rubber, a butadiene/isoprene copolymer rubber, a butadiene/styrene/isoprene copolymer rubber, an acrylonitrile/butadiene copolymer rubber, an acrylonitrile/styrene/butadiene copolymer rubber, a chloroprene rubber and the like. Among them, a styrene/butadiene copolymer rubber is preferable. In addition, a combination of this styrene/butadiene copolymer rubber and a natural rubber is also preferable.

In particular, the styrene/butadiene copolymer rubber having a prescribed Tg may be prepared depending upon the purpose and the use.

As the component (B), an emulsion polymerized rubber obtained by a conjugated diene, or a combination of a conjugated diene and an aromatic vinyl monomer or an olefinic unsaturated nitrile monomer is preferable. For example, there can be exemplified an emulsion polymerized butadiene rubber, an emulsion polymerized styrene/butadiene copolymer rubber, an emulsion polymerized acrylonitrile/butadiene copolymer rubber, and an emulsion polymerized acrylonitrile/styrene/butadiene copolymer rubber. In addition, the component (B) can be used alone or in combination of two or more.

Further, as component (B), a modified diolefin-based rubber having at least one functional group selected from amino group, alkoxysilyl group, epoxy group and hydroxyl group, and a modified diolefin-based rubber obtained by reacting a tin compound or a silicon compound can be used.

The modified diolefin-based rubber having such a functional group is obtained by copolymerizing a monomer having each group and the above-mentioned diolefin-based monomer.

As a monomer having amino group, a monomer having a tertiary amino group is preferred. Examples of the monomer are as follows.

(a) Dialkylaminoalkyl(meth)acrylates, such as dimethylaminomethyl(meth)acrylate, diethylaminomethyl(meth)acrylate, 2-dimethylaminoethyl(meth)acrylate, 2-diethylaminoethyl(meth)acrylate, 2-(di-n-propylamino)ethyl(meth)acrylate, 2-dimethylaminopropyl(meth)acrylate, 2-diethylaminopropyl(meth)acrylate, 2-(di-n-propylamino)propyl(meth)acrylate, 3-dimethylaminopropyl(meth)acrylate, 3-diethylaminopropyl(meth)acrylate and 3-(di-n-propylamino)propyl(meth)acrylate.

(b) Unsaturated amides having N-dialkylaminoalkyl group, such as N-dimethylaminomethyl(meth)acrylamide, N-diethylaminomethyl(meth)acrylamide, N-(2-dimethylaminoethyl)(meth)acrylamide, N-(2-diethylaminoethyl)(meth)acrylamide, N-(2-dimethylaminopropyl)(meth)acrylamide, N-(2-diethylaminopropyl)(meth)acrylamide, N-(3-dimethylaminopropyl)(meth)acrylamide and N-(3-diethylaminopropyl)(meth)acrylamide.

(c) Vinyl aromatic compounds having tertiary amino group, such as N,N-dimethyl-p-aminostyrene, N,N-diethylp-aminostyrene, dimethyl(p-vinylbenzyl)amine, diethyl(p-vinylbenzyl)amine, dimethyl(p-vinylphenethyl)amine, diethyl(p-vinylphenethyl)amine, dimethyl(p-vinylbenzyloxymethyl)amine, dimethyl[2-(p-vinylbenzyloxy)ethyl]amine, diethyl(p-vinylbenzyloxymethyl)amine, diethyl[2-(p-vinylbenzyloxy)ethyl]amine, dimethyl(p-vinylphenethyloxymethyl)amine, dimethyl[2-(p-vinylphenethyloxy)ethyl]amine, diethyl(p-vinylphenethyloxymethyl)amine, diethyl[2-(p-vinylphenethyloxy)ethyl]amine, 2-vinylpyridine, 3-vinylpyridine and 4-vinylpyridine.

Among them, dialkylaminoalkyl(meth)acrylates and vinyl aromatic compounds having tertiary amino group are preferable. For these monomers having amino group, only one species of the respective kinds may be used, or two or more species in one kind may be used, and different kinds may be used.

Examples of a monomer having epoxy group include (meth)acryl glycidyl ether, glycidyl(meth)acrylate, 3,4-oxycyclohexyl(meth)acrylate and the like. These monomers having epoxy group may be used alone or in combination of two or more.

Examples of a monomer having alkoxysilyl group include (meth)acryloxymethyltrimethoxysilane, (meth)acryloxymethylmethyldimethoxysilane, (meth)acryloxymethylmethyldimethoxysilane, (meth)acryloxymethyltriethoxysilane, (meth)acryloxymethylmethyldiethoxysilane, (meth)acryloxymethyldimethylethoxysilane, (meth)acryloxymethyltripropoxysilane, (meth)acryloxymethylmethyldipropoxysilane, (meth)acryloxymethyldimethylpropoxysilane, γ-(meth)acryloxypropyltrimethoxysilane, γ-(meth)acryloxypropylmethyldimethoxysilane, γ-(meta)acryloxypropyldimethylmethoxysilane, γ-(meth)acryloxypropyltriethoxysilane, γ-(meth)acryloxypropylmethyldiethoxysilane, γ-(meth)acryloxylpropyldimethylethoxysilane, γ-(meth)acryloxypropyltripropoxysilane, γ-(meth)acryloxypropylmethyldipropoxysilane, γ-(meth)acryloxypropyldimethylpropoxysilane, γ-(meth)acryloxypropylmethyldiphenoxysilane, γ-(meth)acryloxypropyldimethylphenoxysilane, γ-(meth)acryloxypropylmethyldibenzyloxysilane, γ-(meth)acryloxypropyldimethylphenoxysilane and the like. For these monomers, only one species of the respective kinds may be used, or two or more species in one kind may be used, and different kinds may be used.

Examples of a monomer having hydroxyl group include hydroxyalkyl(meth)acrylates such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate and 4-hydroxybutyl(meth)acrylate; mono(meth)acrylates of polyalkylene glycol (the number of alkylene glycol unit is 2 to 23) such as polyethylene glycol and polypropylene glycol; unsaturated amides having hydroxyl group such as N-hydroxymethyl(meth)acrylamide, N-)2-hydroxyethyl)(meth)acrylamide and N,N-bis(2-hydroxyethyl)(meth)acrylamide; and vinyl aromatic compounds having hydroxyl group such as o-hydroxystyrene, m-hydroxystyrene, p-hydroxystyrene, p-hydroxy-α-methylstyrene, m-hydroxy-α-methylstyrene, p-hydroxy-α-methylstyrene and p-vinylbenzyl alcohol.

Among them, hydroxyalkyl(meth)acrylates, and vinyl aromatic compounds having hydroxyl group are preferable. These monomers having hydroxy group may be used alone or in combination of two or more.

A tin compound, used for modified diolefin-based rubber for the component (B), may be tin tetrachloride and an organic tin compound such as alkyl tin trichloride (for example, butyl tin trichloride) and dialkyl tin dichloride (for example, dibutyl tin dichloride). A polymer terminal is modified by such a tin compound.

In addition, a silicon compound may be used as an organic silicon compound, such as butyl silicon dichloride, methyl silicon trichloride, dimethyl silicon dichloride, diethyl silicon dichloride, silicon tetrachloride and the like. A polymer terminal is modified by such a silicon compound.

The modified diolefin-based rubber can be prepared by emulsion polymerization, suspension polymerization, solution radical polymerization, solution anion polymerization, or solution transition metal catalyzed polymerization and the like. Among them, emulsion polymerization and solution anion polymerization are preferable.

Mw of the component (B) is exceeding 200,000, preferably of 250,000 or more, more preferably 300,000 or more, further preferably 250,000 to 1,000,000, and particularly 300,000 to 1,000,000. When Mw is 200,000 or less, there is a tendency that the mechanical strength is reduced.

In addition, Tg of the component (B) is −30° C. or lower, preferably −33° C. or lower, more preferably −35° C. or lower, further preferably −30° C. to −100° C., and particularly −33° C. to −80° C. When Tg exceeds −30° C., there is a tendency that the low temperature property is deteriorated.

Further, a difference between Tg of component (A) and Tg of component (B) is preferably 5° C. or more, more preferably 10° C. or more, further preferably 20° C. or more, particularly 25° C. or more, and most preferably 30° C. or more. Each glass transition temperature of the component (A) or the component (B), when they compose a plurality of components, indicates an average value calculated based on a weight blending ratio, respectively.

The content of the diolefin-based rubber (B) is 95 to 60 parts by weight, preferably 90 to 65 parts by weight, more preferably 90 to 70 parts by weight, based on 100 parts by weight of the total of the component (A) and (B). When the content of the component (B) exceeds 95 parts by weight, there is a tendency that the vibration-isolating performance is decreased. On the other hand, when the content is less than 60 parts by weight, there is a tendency that the mechanical strength property is deteriorated.

The rubber composition of the present invention may contain other rubber components in addition to the component (A) and (B), unless reducing the effect of the invention.

Further, the rubber composition of the present invention may contain additives such as a filler, a crosslinking agent, an oil, an anti-aging agent, a plasticizer, a tackifier, a thermal stabilizer, a light stabilizer, an ultraviolet absorber, a coloring agent, an antistatic agent, a lubricant, a flame retardant and the like, depending upon the purpose and the use.

The filler includes an inorganic filler, such as carbon black, silica, carbon-silica dual phase filler, clay, calcium carbonate, magnesium carbonate, an organic filler such as a polymer filler, and the like. These fillers can be used alone or in combination of two or more.

Carbon black is not particularly limited, but furnace black, acetylene black, thermal black, channel black, graphite black and the like can be used. Among them, furnace black is particularly preferable. Examples thereof include various grades of carbon blacks such as SAF, ISAF, ISAF-HS, ISAF-LS, IISAF-HS, HAF, HAF-HS, HAF-LS, MAF, FEF, FEF-LS, GPF, GPF-HS, GPF-LS, SRF, SRF-HS, SRF- LM and the like. These may be used alone or by a combination of two or more.

A nitrogen adsorption specific area ($N_2SA$) of carbon black is not particularly limited, but it is in a range of, normally 5 to 200 $m^2/g$, preferably 10 to 150 $m^2/g$, more preferably 20 to 130 $m^2/g$. The above range leads to a dynamic-to-static modulus ratio and a loss factor improved at a high level. In addition, a DBP adsorption level of carbon black is not particularly limited, but it is in a range of, normally 5 to 300 ml/100 g, preferably 20 to 200 ml/100 g, more preferably 50 to 160 ml/100 g. The above range leads to a dynamic-to-static modulus ratio and a loss factor improved at a high level.

Silica is not particularly limited, but a dry method white carbon, a wet method white carbon, a colloidal silica and a precipitated silica and the like can be used. Among them, a wet method white carbon containing mainly hydrous silicic acid is particularly preferable. These may be used alone or in combination of two or more.

A specific surface area of silica is not particularly limited, but it is in a range of, normally 50 to 400 $m^2/g$, preferably 100 to 250 $m^2/g$, further preferably 120 to 220 $m^2/g$, expressed as a nitrogen adsorption specific area. The above range leads to a dynamic-to-static modulus ratio and a loss factor improved at a high level. As used herein, the nitrogen adsorption specific area is a value measured by a BET method according to ASTM D3037 81.

Carbon black and silica may be used together, and a mixing ratio in the case is appropriately selected depending on the use and the purpose, and a weight ratio of silica and carbon black is normally 1:99 to 99:1, preferably 10:90 to 90:10, and more preferably 30:70 to 70:30.

The amount of the filler to be added is preferably 10 to 200 parts by weight, more preferably 10 to 150 parts by weight, further preferably 20 to 100 parts by weight, particularly 20 to 80 parts by weight, based on 100 parts by weight of the total rubber component including the component (A) and the component (B). When the amount of the filler is less than 10 parts by weight, there is a tendency that the break strength is reduced. On the other hand, when the amount exceeds 200 parts by weight, there is a tendency that the vibration-isolating performance is deteriorated.

Examples of the cross-linking agent include sulfurs, such as powdery sulfur, precipitated sulfur, colloidal sulfur, insoluble sulfur, high dispersion sulfur, halogenated sulfurs such as sulfur monochloride and sulfur dichloride; organic peroxides, such as dicumyl peroxide and di-t-butyl peroxide; quinone dioximes, such as p-quinone dioxime and p-p'-dibenzoylquinone dioxime; organic multivalent amine compounds, such as triethylenetetramine, hexamethylenediamine carbamate and 4,4'-methylenebis-o-chloroaniline; an alkylphenol resin having a methylol group, and the like. Among them, sulfur is preferable, and powdery sulfur is particularly preferable. For these cross-linking agents, only one species of the respective kinds may be used, or two or more species in one kind may be used, and different kinds may be used.

The amount of the crosslinking agent to be added is preferably 0.1 to 15 parts by weight, more preferably 0.3 to 10 parts by weight, further preferably 0.5 to 5 parts by weight, based on 100 parts by weight of the total rubber component including the component (A) and the component (B). The above range leads to a vibration-isolating rubber having excellent properties.

When the crosslinking agent is used, a vulcanization accelerator is usually used together. Examples of the vulcanization accelerator include a sulfenamide-based vulcanization accelerator, such as N-cyclohexyl-2-benzothiazole sulfenamide, N-t-butyl-2-benzothiazole sulfenamide, N-oxyethylene-2-benzothiazole sulfenamide and N,N'-diisopropyl-2-benzothiazole sulfenamide;

a guanidine-based vulcanization accelerator, such as diphenylguanidine, diorthotolylguanidine and orthotolylbiguanidine;

a thiourea-based vulcanization accelerator, such as thiocarboanilide, diorthotolylthiourea, ethylenethiourea, diethylthiourea and trimethylthiourea;

a thiazole-based vulcanization accelerator, such as 2-mercaptobenzothiazole, dibenzothiazyl disulfide, 2-mercaptobenzothiazole zinc salt, 2-mercaptobenzothiazole sodium salt, 2-mercaptobenzothiazole cyclohexylamine salt and 2-(2,4-dinitrophenylthio)benzothiazole;

a thiuram-based vulcanization accelerator, such as tetramethylthiuram monosulfide, tetramethylthiuram disulfide, tetraethylthiuram disulfide, tetrabutylthiuram disulfide and dipentamethylenethiuram tetrasulfide;

a dithiocarbamic acid-based vulcanization accelerator, such as sodium dimethyldithiocarbamate, sodium diethyldithiocarbamate, sodium di-n-butyldithiocarbamate, lead dimethyldithiocarbamate, zinc dimethyldithiocarbamate, zinc diethyldithiocarbamate, zinc di-n-butyldithiocarbamate, zinc pentamethylenedithiocarbamate, zinc ethylphenyldithiocarbamate, tellurium diethyldithiocarbamate, selenium dimethyldithiocarbamate, selenium diethyldithiocarbamate, copper dimethyldithiocarbamate, iron dimethyldithiocarbamate, diethyldithiocarbamic acid diethylamine, pentamethylenedithiocarbamic acid piperidine and methylpentamethylenedithiocarbamic acid pipecoline;

a xanthogenic acid-based vulcanization accelerator, such as sodium isopropylxanthate, zinc isopropylxanthate and zinc butylxanthate, and the like.

For these vulcanization accelerators, only one species of the respective kinds may be used, or two or more species in one kind may be used, and different kinds may be used. As a vulcanization accelerator, it is particularly preferable that at least a sulfenamide-based vulcanization accelerator is used.

The amount of the vulcanization accelerator to be added is preferably 0.1 to 15 parts by weight, more preferably 0.3 to 10 parts by weight, further preferably 1 to 10 parts by weight, based on 100 parts by weight of the total rubber component including the component (A) and the component (B).

In addition, when a sulfur-based compound is used as a crosslinking agent, a vulcanization activating agent may be used. The vulcanization activating agent includes zinc oxide, a higher fatty acid such as stearic acid, and the like. Zinc oxide having a high surface activation and a particle diameter of 5 $\mu$m or less is preferable. Examples of such zinc oxide include an active zinc white having a particle diameter of 0.05 to 0.2 $\mu$m, or a zinc white having a particle diameter of 0.3 to 1 $\mu$m. A zinc oxide, whose surface is treated with an amine-based dispersant or a wetting agent, may be used.

For these vulcanization activating agents, only one species of the respective kinds may be used, or two or more species in one kind may be used, and different kinds may be used. The suitable amount of the vulcanization activating agent added depends on the kind thereof. When zinc oxide is used, it is preferable that the amount is 0.05 to 10 parts by weight, more preferably 0.1 to 7 parts by weight, further preferably 0.5 to 5 parts by weight, based on 100 parts by weight of the total rubber component including the component (A) and the component (B). And when a higher fatty acid is used, it is preferable that the amount is 0.05 to 15 parts by weight, preferably 0.1 to 10 parts by weight, further preferably 0.5 to 5 parts by weight. These ranges lead to improved processability.

The oil includes a mineral oil, such as a process oil, a paraffin wax and a liquid paraffin, a vegetable oil such as a castor oil and a cotton seed oil, a synthetic oil and the like. As the process oil, an aromatic-based oil, a naphthene-based oil, a paraffin-based oil and the like are normally used. These oils can be used alone or in combination of two or more. The amount of the oil added depends on the kind thereof. When an aromatic-based oil is used, it is preferably 15 to 50 parts by weight, based on 100 parts by weight of the total rubber component including the component (A) and the component (B).

In addition, examples of the anti-aging agent include amines, phenols and the like. Examples of the plasticizer include phosphate esters such as tributyl phosphate, acid esters such as dibutyl phthalate, butyl oleate and dibutyl adipate, chlorinated paraffin, and the like.

The. vibration-isolating rubber of the present invention is a crosslinked rubber of the rubber composition comprising 5 to 40 parts by weight of a styrene-butadiene-based copolymer rubber (A), having a weight-average molecular weight of 200,000 or less and a glass transition temperature of $-35°$ C. or higher, and 95 to 60 parts by weight of a diolefin-based rubber (B), having a weight-average molecular weight exceeding 200,000 and a glass transition temperature of $-20°$ C. or lower, based on 100 parts by weight of the total amount of (A) and (B).

The styrene-butadiene-based copolymer rubber (A) and the diolefin-based rubber (B) are applied to the component (A) and the component (B) respectively, of the vibration-isolating rubber, as explained in the above rubber composition, respectively.

It is preferable that the vibration-isolating rubber has a performance such that the relationship between a dynamic-to-static modulus ratio (Kd/Ks) and a loss factor (tan δ) is under a straight line (1) (meaning a solid line, being a border line of the equation (1)) shown in FIG. 1.

$$Kd/Ks \leq 20 \tan \delta - 1.8 \quad (1)$$

It is successively preferable that the rubber has performances shown by the following equation (2), equation (3) and equation (4), respectively.

$$Kd/Ks \leq 20 \tan \delta - 1.9 \quad (2)$$

$$Kd/Ks \leq 20 \tan \delta - 2.0 \quad (3)$$

$$Kd/Ks \leq 20 \tan \delta - 2.1 \quad (4)$$

In addition, it is further preferable that the rubber has a performance shown by the following equation (5) which is under the straight line (5) as shown in FIG. 1.

$$Kd/Ks \leq 20 \tan \delta - 2.2 \quad (5)$$

Further, a dynamic-to-static modulus ratio (Kd/Ks) can be 4 or less, further preferably 3 or less, in addition to being in a range shown by the equation (1), equation (2), equation (3), equation (4) or equation (5).

A specific process for preparing a vibration-isolating rubber of the present invention is as follows. First, a rubber component, a filler such as silica, carbon black and carbon silica dual phase filler, a vulcanization accelerator, a vulcanization activating agent and other additives are kneaded at a temperature in the range of 70° C. to 180° C. using a kneading machine such as Banbury mixer. Thereafter, this kneaded material is cooled, a vulcanizing agent such as sulfur, a vulcanization accelerator and the like are blended using a Banbury mixer, a mixing roll or the like, to form into a prescribed shape. Then, vulcanization is performed at a temperature in the range of 140° C. to 180° C., to obtain a desired vulcanized rubber, that is, a vibration-isolating rubber. A method of crosslinking is not limited to the above-mentioned method, but crosslinking may be performed by a method suitable for a particular crosslinking agent.

The vibration-isolating mount of the present invention comprises the above vibration-isolating rubber which is obtained by crosslinking a rubber composition comprising 5 to 40 parts by weight of a styrene-butadiene-based copolymer rubber (A), having a weight-average molecular weight of 200,000 or less and a glass transition temperature of $-35°$ C. or higher, and 95 to 60 parts by weight of a diolefin-based rubber (B), having a weight-average molecular weight exceeding 200,000 and a glass transition temperature of $-20°$ C. or lower; weights based on 100 parts by weight of the total amount of (A) and (B).

The styrene-butadiene-based copolymer rubber (A) and the diolefin-based rubber (B) according to the vibration-isolating rubber are applied to the component (A) and the component (B), as explained in the above rubber composition, respectively.

This mount may have a shape that depends on the use or the purpose; for example, a sheet-like, a plate-like, a box-like shape and the like. In the case of a sheet-like shape, the mount can be used so as to wrap a vibration-isolating subject (e.g. car engine, etc.), and in the case of a plate-like shape, the mount can be used by attaching it to a prescribed subject.

EXAMPLES

Figure 1:
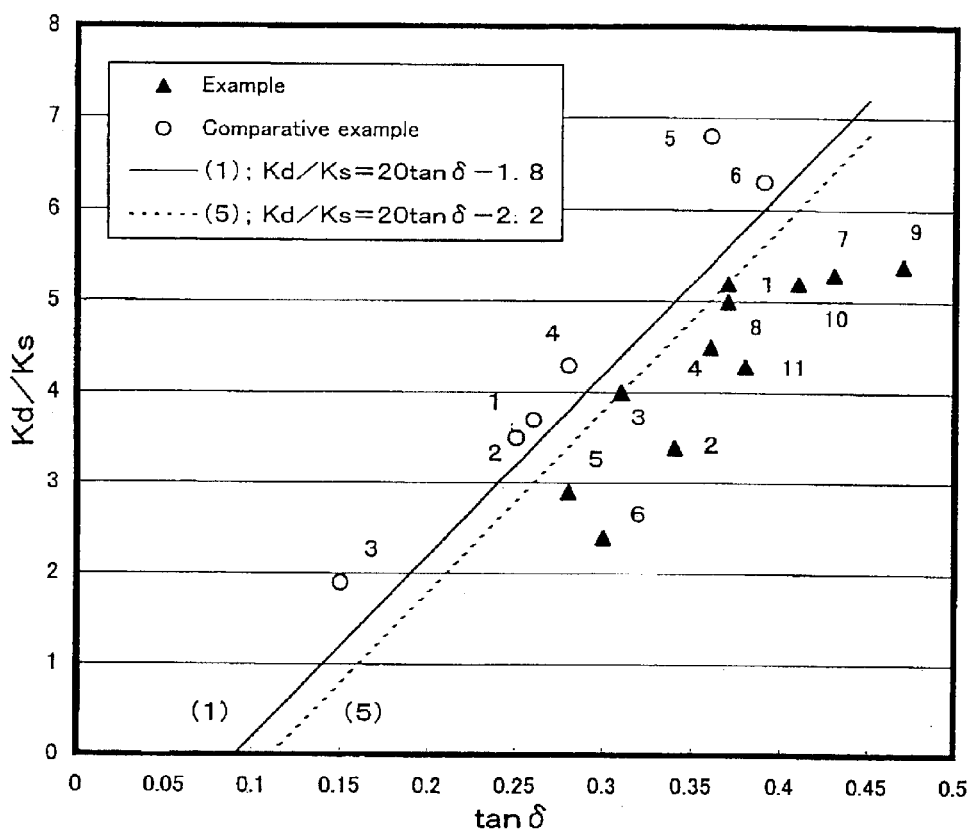
FIG. 1 is a view for a relationship between a dynamic-to-static modulus ratio (Kd/Ks) and a loss factor (tan δ) in the Examples.
Figure 2:
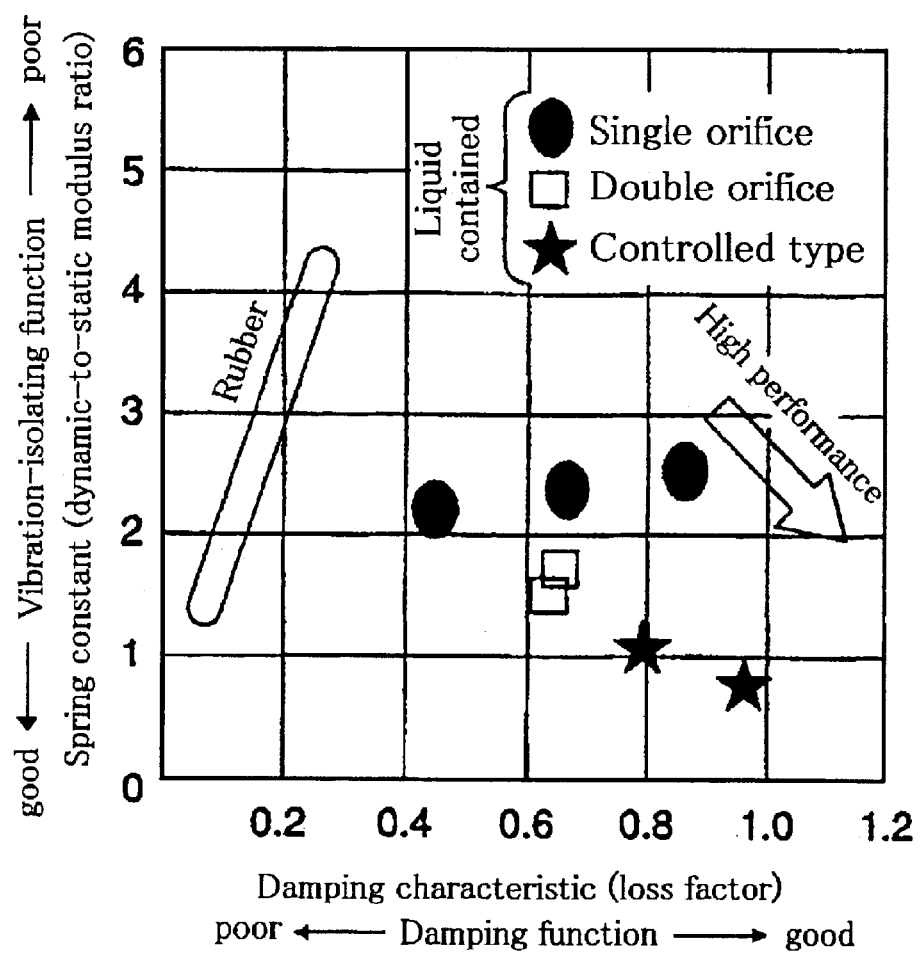
FIG. 2 is a view for the dynamic property map of the known vibration-isolating rubber.

The present invention is specifically explained below by way of Example. Examples 1 to 11 and Comparative Examples 1 to 6

(1) Preparation of a Rubber Composition and Production of a Vibration-isolating Rubber For preparing rubber compositions, styrene/butadiene-based copolymer rubbers (A) and diolefin-based rubbers (13) shown in Table 1 were used. In the component (B) shown in Table 1, the rubbers, except the natural rubber, are styrene/butadiene copolymer rubbers. "SL574" is a tin-modified styrene/butadiene rubber manufactured by JSR Corp. "#1502" is a styrene/butadiene copolymer rubber manufactured by JSR Corp.

TABLE 1

| | Mw (×10⁴) | Tg (° C.) | Vinyl content (%) | Bound styrene content (mol %) | Hydrogenation rate (%) |
|---|---|---|---|---|---|
| Component (A) | | | | | |
| A-1 | 1 | −5 | 56 | 56 | 0 |
| A-2 | 5 | −16 | 54 | 48 | 85 |
| A-3 | 10 | −40 | 60 | 22 | 0 |
| A-4 | 0.12 | −14 | 25 | 63 | 0 |
| A-5 | 1.5 | −16 | 54 | 46 | 0 |
| Component (B) | | | | | |
| SBR-1 | 80 | −33 | 42 | 35 | 0 |
| SL574 | 61 | −48 | 58 | 15 | 0 |
| SBR-2 | 30 | −65 | 41 | 11 | 0 |
| #1502 | 45 | −57 | 10 | 23 | 0 |
| Natural rubber | 150 | −60 | 0 | 0 | 0 |
| SBR-3 | 74 | −27 | 44 | 36 | 0 |
| SBR-4 | 76 | −18 | 52 | 44 | 0 |
| SBR-5 | 38 | −26 | 45 | 36 | 0 |

Weight-average molecular weight (Mw), glass transition temperature (Tg), vinyl content, bound styrene content and hydrogenation rate of the component (A) and the component (B) are shown in Table 1. Methods for measuring these properties are as follows.

Mw was obtained by gel permeation chromatography (GPC) as reduced to polystyrene.

Tg was measured at a temperature raising rate of 10° C./min, using a differential scanning calorimeter (DSC) manufactured by Seiko Instruments Inc., and by obtaining an extrapolating initiating temperature.

Vinyl content of a butadiene part was obtained by an infrared absorption method (Molero method).

Bound styrene content was obtained by a calibration curve using an infrared absorption spectrum method.

The component (A) and the component (B) which are ready in separate form can be used, however, a mixture containing both components can be used. Production process of "A-5" and "SBR-3" used in Example 10 are as follows.

Cyclohexane (3,000 g), styrene (131 g), 1,3-butadiene (196 g) and tetrahydrofurane (21.2 g) were added to a reactor, having an inner volume of 5 liter replaced with nitrogen. A temperature was controlled at 40° C., and 2.4 mmol of n-butyllithium was added to initiate a polymerization. After reaching 100% of the conversion, 33 g of 1,3-butadiene was added to continue polymerization. A terminal of the polymer became butadienyl lithium. Then 1.83 mmol of silicon tetrachloride was added to react for 10 minutes to produce "SBR-3". Next, 61 g of styrene and 75 g of 1,3-butadiene were added to the polymer solution containing the "SBR-3". A temperature was controlled at 60° C., and 12.8mmol of n-butyllithium was added to polymerize for 20 minutes to "A-5". Then 2,6-di-t-butyl-p-cresol was added to this polymer solution. After removal of solvent by steam stripping, a rubber component was dried in a thermal drier at 110° C. to obtain a mixture of "A-5" and "SBR-5".

In addition, a mixture of "A-5" and "SBR-5" used in Example 11 was obtained similarly to above method except for exchanging 1.83 mmol of silicon tetrachloride for 1.61 mmol of methyltriphenoxysilane.

Rubber compositions shown in Tables 2 to 4 were prepared by using the component (A), the component (B) and additives below:

(i) Aromatic oil: Fujikosan Co. Ltd., Trade name; "Fukkol Aromax #3", (ii) Carbon black: Mitsubishi Chemical Co. Ltd., Trade name; "DIABLACK N330", (iii) Silica: Nippon Silica Industrial Co. Ltd., Trade name; "NIPSIL AQ", (iv) Anti-aging agent; Ouchishinko Chemical Industrial Co. Ltd., Trade name; "NOCRAC 810NA", and (v) Vulcanization accelerator (I); Ouchishinko Chemical Industrial Co. Ltd., Trade name; "NOCCELER D".

Here, differences between respective glass transition temperatures between the component (A) and the component (B) in Examples 1 to 10, Comparative Examples 1 and 5 are as follows. It is noted that when the component (B) comprises two components such as Examples 1 to 6, 8 and Comparative Example 1, an average calculated based on a blending ratio is indicated. The former of the numbers in parentheses is Tg of the component (B) and the latter is Tg of the component (A).

Example 1; 24(−40, −16), Example 2; 24 (−40, −16), Example 3; 48 (−53, −5), Example 4; 46 (−51, −5), Example 5; 58 (−63, −5), Example 6; 58 (−63, −5), Example 7; 17 (−33, −16), Example 8; 26 (−40, −14), Example 9; 13 (−27, −14), Example 10; 11 (−27, −16), Comparative Example. 1; 23 (−63, −40), Comparative Example 5; 4 (−18,−14).

TABLE 2

| | Example | | | | | |
|---|---|---|---|---|---|---|
| | 1 | 2 | 3 | 4 | 5 | 6 |
| Component (A) | | | | | | |
| A-1 | | | 20 | 25 | 20 | 20 |
| A-2 | 25 | 25 | | | | |
| A-3 | | | | | | |
| A-4 | | | | | | |
| A-5 | | | | | | |
| Component (B) | | | | | | |
| SBR-1 | 55 | 55 | | | | |
| SL574 | | | 50 | 55 | | |
| SBR-2 | | | | | 50 | 50 |
| #1502 | | | | | | |
| Natural rubber | 20 | 20 | 30 | 20 | 30 | 30 |
| SBR-3 | | | | | | |
| SBR-4 | | | | | | |
| SBR-5 | | | | | | |
| Additive | | | | | | |
| Aromatic oil | 5 | 5 | 30 | 5 | 30 | 30 |
| Carbon black | 50 | 25 | 65 | 50 | 65 | 20 |
| Silica | | | | | | 10 |
| ZnO | 5 | 5 | 5 | 5 | 5 | 5 |
| Stearic acid | 1 | 1 | 1 | 1 | 1 | 1 |
| Anti-aging agent | 3 | 3 | 3 | 3 | 3 | 3 |
| Vulcanization accelerator | 2 | 2 | 2 | 2 | 2 | 2 |
| Sulfur | 1.9 | 1.9 | 1.9 | 1.9 | 1.9 | 1.9 |
| Vibration-isolating characterization | | | | | | |
| Kd | 10.1 | 4.5 | 7.6 | 6.9 | 5.3 | 3.5 |
| Ks | 1.95 | 1.31 | 1.91 | 1.54 | 1.81 | 1.43 |
| Kd/Ks | 5.2 | 3.4 | 4.0 | 4.5 | 2.9 | 2.4 |
| tanδ | 0.37 | 0.34 | 0.31 | 0.36 | 0.28 | 0.30 |

TABLE 3

| | Example | | | | |
|---|---|---|---|---|---|
| | 7 | 8 | 9 | 10 | 11 |
| Component (A) | | | | | |
| A-1 | | | | | |
| A-2 | 25 | | 25 | | |
| A-3 | | | | | |
| A-4 | | 25 | | | |
| A-5 | | | | 25 | 25 |
| Component (B) | | | | | |
| SBR-1 | 75 | 55 | | | |
| SL574 | | | | | |
| SBR-2 | | | | | |
| #1502 | | | | | |
| Natural rubber | | 20 | | | |
| SBR-3 | | | 75 | | 75 |
| SBR-4 | | | | | |
| SBR-5 | | | | 75 | |
| Additive | | | | | |
| Aromatic oil | 5 | 5 | 5 | 5 | 5 |
| Carbon black | 50 | 50 | 50 | 50 | 50 |
| Silica | | | | | |
| ZnO | 5 | 5 | 5 | 5 | 5 |
| Stearic acid | 1 | 1 | 1 | 1 | 1 |
| Anti-aging agent | 3 | 3 | 3 | 3 | 3 |
| Vulcanization accelerator | 2 | 2 | 2 | 2 | 2 |
| Sulfur | 1.9 | 1.9 | 1.9 | 1.9 | 1.9 |
| Vibration-isolating characterization | | | | | |
| Kd | 12.2 | 9.8 | 13.6 | 21.5 | 17.1 |
| Ks | 2.3 | 1.93 | 2.51 | 4.10 | 3.97 |
| Kd/Ks | 5.3 | 5.0 | 5.4 | 5.2 | 4.3 |
| tan δ | 0.43 | 0.37 | 0.47 | 0.41 | 0.38 |

TABLE 4

| | Comparative Example | | | | | |
|---|---|---|---|---|---|---|
| | 1 | 2 | 3 | 4 | 5 | 6 |
| Component (A) | | | | | | |
| A-1 | | | | | | |
| A-2 | | | | | 25 | |
| A-3 | 20 | | | | | |
| A-4 | | | | | | |
| A-5 | | | | | | 50 |
| Component (B) | | | | | | |
| SBR-1 | | | | 80 | | |
| SL574 | | | | | | |
| SBR-2 | 50 | | | | | |
| #1502 | | 70 | 80 | | | |
| Natural rubber | 30 | 30 | 20 | 20 | | |
| SBR-3 | | | | | | 50 |
| SBR-4 | | | | | 75 | |
| SBR-5 | | | | | | |
| Additive | | | | | | |
| Aromatic oil | 30 | 30 | 25 | 30 | 5 | |
| Carbon black | 65 | 65 | 25 | 65 | 50 | 50 |
| Silica | | | | | | |
| ZnO | 5 | 5 | 5 | 5 | 5 | 5 |
| Stearic acid | 1 | 1 | 1 | 1 | 1 | 1 |
| Anti-aging agent | 3 | 3 | 3 | 3 | 3 | 3 |
| Vulcanization accelerator | 2 | 2 | 2 | 2 | 2 | 2 |
| Sulfur | 1.9 | 1.9 | 1.9 | 1.9 | 1.9 | 1.9 |
| Vibration-isolating characterization | | | | | | |
| Kd | 6.3 | 6.2 | 2.2 | 7.8 | 15.1 | 14.6 |
| Ks | 1.70 | 1.77 | 1.16 | 1.80 | 2.21 | 2.30 |
| Kd/Ks | 3.7 | 3.5 | 1.9 | 4.3 | 6.8 | 6.3 |
| tan δ | 0.26 | 0.25 | 0.15 | 0.28 | 0.36 | 0.39 |

Vibration-isolating rubbers were produced using the above rubber compositions as follows. That is, the component (A), the component (B) and additives, except for the vulcanization accelerator and sulfur, were all placed into 250 cc "Laboplast mill" (manufactured by Toyoseiki Co. Ltd.) controlled at 100° C., and kneaded for 4 minutes. Then the kneaded material was removed from the mill and left for 2 hours. After that, the kneaded rubber, a vulcanization accelerator and sulfur were all placed into the same mill controlled at 70° C., and kneaded for 1 minute to a non-vulcanized rubber composition. In Examples 5 to 9, a mixture of component (A) and component (B), except the natural rubber, was prepared first, and the mixture and the rest component were kneaded to a rubber composition.

Next, the composition was formed into a prescribed shape, which was vulcanized at 160° C.×20 min. to obtain a vibration-isolating rubber (cylinder of diameter 9 mm and height 9 mm).

(2) Measurement of the Vibration-isolating Property

The vibration property of the resulting vibration-isolating rubber was measured using "ARES" manufactured by Rheometric Scientific. A loss coefficient (tan δ) was measured at a temperature of 23° C., a frequency of 15 Hz and a distortion of 3%. Similarly, a dynamic spring constant (Kd) was measured at a temperature of 10° C., a frequency of 15 Hz, and a distortion of 0.2%. Further, a static spring constant (Ks) was obtained from a stress at a third distortion under the conditions of a temperature of 23° C., a frequency of 0.01 Hz, and a distortion of 10%. Results are shown in Tables 2 to 4 and FIG. 1.

(3) Effect of Examples

From the results in Tables 2 to 4 and FIG. 1, the following can be seen. That is, in Comparative Example 1 (using the component (A) having Tg of −40° C.) and Comparative Examples 2 to 4 (not containing the component (A)), a relationship between a dynamic-to-static modulus ratio and a loss factor (hereinafter, referred to as "plotted points") is situated above a straight line (solid) (1) as shown in FIG. 1, and thus, it is seen that the vibration-isolating property is not sufficient. Comparative Examples 1 to 6 are shown by a round symbol in the figure. Moreover, when the corresponding data are plotted, they are situated approximately on a straight line. In particular, Comparative Examples 2 to 4 are homologous in a composition component, exhibiting the excellent linearity.

On the other hand, the data from Examples 1 to 11 which are the examples of the present invention show no linearity and show a wide extension, as shown FIG. 1. This is an entirely unexpected result. Data from Examples 1 to 11 are shown by a triangle symbol in FIG. 1. Moreover, all are situated significantly under a straight region representing the data from Comparative Examples 1 to 6. The dotted line (5) in FIG. 1 includes the plotted point of Example 3. In addition, a solid straight line (1) is shown approximately intermediate distance between plotted point of Example 3 and plot points of Comparative Examples 1 to 4.

In addition, when Example 5 containing the component (A), and Comparative Example 1, without the component (A) (other components are entirely same), are compared, as shown in FIG. 1, the plotted point of Example 5 is greatly shifted downwardly from plotted point of Comparative Example 1. Even when Example 6 having the same components as Example 5, except different additives and ratio thereof, is compared with Comparative Example 1, the plotted point of Example 6 is further greatly shifted downwardly.

From this, it is seen that the performance is greatly different depending on the presence or absence of the component (A), and Examples 5 and 6 containing the component (A) show an extremely excellent performance.

In addition, in both Examples 2 and 3, each dynamic-to-static modulus ratio is 4 or smaller, and it is seen that the dynamic-to-static modulus ratio indicates a small value, shifting right-downwardly in FIG. 1. In particular, in both of Examples 5 and 6, it is seen that each dynamic-to-static modulus ratio is 3 or smaller, further shifting right-downwardly in FIG. 1. These lead to remarkably more excellent vibration-isolating performance as compared with the previous products and the Comparative Examples products. In addition, Examples 1 and 4 show that each loss factor shows a great value although a dynamic-to-static modulus ratio is great, being excellent in vibration isolating property. These data points are situated under the solid straight line (1).

Comparative Example 6 is one in which the contents of component (A) and component (B) are out of the range of the present invention.

From the foregoing, as shown in FIG. 1, data from Examples 1 to 11 show no linearity and a wide extension, and moreover, are situated greatly under a linear region indicating data from the Comparative Examples, and thus show excellent vibration-isolating property and unexpected results.

The present invention is not limited to the abovementioned specific examples, but examples variously modified within the scope of the present invention can be obtained, depending on the use and the purpose. For example, in the abovementioned Examples, besides a natural rubber, all use a styrene-butadiene copolymer rubber, but a butadiene rubber and an isoprene rubber can also be used.

What is claimed is:

1. A rubber composition characterized in comprising 5 to 40 parts by weight of a styrene-butadiene-based copolymer rubber (A) having a weight-average molecular weight of 200,000 or less and a glass transition temperature of −35° C. or higher, and 95 to 60 parts by weight of a diolefin-based rubber (B) having a weight-average molecular weight exceeding 200,000 and a glass transition temperature of −20° C. or lower, based on 100 parts by weight of the total amount of (A) and (B).

2. The rubber composition according to claim 1, wherein said diolefin-based rubber (B) is at least one rubber selected from the group consisting of a styrene-butadiene copolymer rubber, a butadiene rubber, an isoprene rubber and a natural rubber.

3. The rubber composition according to claim 2, wherein a weight-average molecular weight of said styrene-butadiene-based copolymer rubber (A) is 500 to 80,000.

4. The rubber composition according to claim 3, further comprising 10 to 200 parts by weight of a filler based on 100 parts of the total amount of said styrene-butadiene-based copolymer rubber (A) and said diolefin-based rubber (B).

5. The rubber composition according to claim 3, wherein said styrene-butadiene-based copolymer rubber (A) is hydrogenated at 50% or more.

6. The rubber composition according to claim 5, further comprising 10 to 200 parts by weight of a filler based on 100 parts of the total amount of said styrene-butadiene-based copolymer rubber (A) and said diolefin-based rubber (B).

7. The rubber composition according to claim 2, wherein said diolefin-based rubber (B) is at least one rubber selected from the group consisting of a modified diolefin-based rubber having at least one functional group selected from the group consisting of amino group, alkoxysilyl group, epoxy group and hydroxyl group, and a modified diolefin-based rubber obtained by reacting a diolefin-based rubber with a tin compound or a silicon compound.

8. The rubber composition according to claim 7, further comprising 10 to 200 parts by weight of a filler based on 100 parts of the total amount of said styrene-butadiene-based copolymer rubber (A) and said diolefin-based rubber (B).

9. A vibration-isolating rubber which is obtained by crosslinking a rubber composition comprising 5 to 40 parts by weight of a styrene-butadiene-based copolymer rubber (A) having a weight-average molecular weight of 200,000 or less and a glass transition temperature of −35° C. or higher, and 95 to 60 parts by weight of a diolefin-based rubber (B) having a weight-average molecular weight exceeding 200,000 and a glass transition temperature of −20° C. or lower, based on 100 parts by weight of the total amount of (A) and (B).

10. The vibration-isolating rubber according to claim 9, wherein said diolefin-based rubber (B) is at least one rubber selected from the group consisting of a styrene-butadiene copolymer rubber, a butadiene rubber, an isoprene rubber and a natural rubber.

11. The vibration-isolating rubber according to claim 10, wherein a weight-average molecular weight of said styrene-butadiene-based copolymer rubber (A) is 500 to 80,000.

12. The vibration-isolating rubber according to claim 11, wherein said styrene-butadiene-based copolymer rubber (A) is hydrogenated at 50% or more.

13. The vibration-isolating rubber according to claim 12 wherein a relationship between a dynamic-to-static modulus ratio (Kd/Ks) which is a ratio of a dynamic spring constant (Kd) and a static spring constant (Ks), and a loss factor (tan δ) is shown by the following equation (1):

$$Kd/Ks \leq 20 \tan \delta - 1.8 \qquad (1).$$

14. The vibration-isolating rubber according to claim 10 wherein said diolefin-based rubber (B) is at least one rubber selected from the group consisting of a modified diolefin-based rubber having at least one functional group selected from the group consisting of amino group, alkoxysilyl group, epoxy group and hydroxyl group, and a modified diolefin-based rubber obtained by reacting a diolefin-based rubber with a tin compound or a silicon compound.

15. The vibration-isolating rubber according to claim 14 wherein a relationship between a dynamic-to-static modulus ratio (Kd/Ks) which is a ratio of a dynamic spring constant (Kd) and a static spring constant (Ks), and a loss factor (tan δ) is shown by the following equation (1):

$$Kd/Ks \leq 20 \tan \delta - 1.8 \qquad (1).$$

16. A vibration-isolating mount comprising a vibration-isolating rubber which is obtained by crosslinking a rubber composition comprising 5 to 40 parts by weight of a styrene butadiene-based copolymer rubber (A) having a weight-average molecular weight of 200,000 or less and a glass transition temperature of −35° C. or higher, and 95 to 60 parts by weight of a diolefin-based rubber (B) having a weight-average molecular weight exceeding 200,000 and a glass transition temperature of −20° C. or lower, based on 100 parts by weight of the total amount of (A) and (B).

17. The vibration-isolating mount according to claim 16, wherein said styrene-butadiene-based copolymer rubber (A) is hydrogenated at 50% or more.

18. The vibration-isolating mount according to claim 17 wherein a relationship between a dynamic-to-static modulus ratio (Kd/Ks) which is a ratio of a dynamic spring constant (Kd) and a static spring constant (Ks), and a loss factor (tan $\delta$) is shown by the following equation (1):

$$Kd/Ks \leq 20 \tan \delta - 1.8 \qquad (1).$$

19. The vibration-isolating mount according to claim 18 wherein said diolefin-based rubber (B) is at least one rubber selected from the group consisting of a modified diolefin-based rubber having at least one functional group selected from the group consisting of amino group, alkoxysilyl group, epoxy group and hydroxyl group, and a modified diolefin-based rubber obtained by reacting a diolefin-based rubber with a tin compound or a silicon compound.

20. The vibration-isolating mount according to claim 19 wherein a relationship between a dynamic-to-static modulus ratio (Kd/Ks) which is a ratio of a dynamic spring constant (Kd) and a static spring constant (Ks), and a loss factor (tan $\delta$) is shown by the following equation (1).

$$Kd/Ks \leq 20 \tan \delta - 1.8 \qquad (1).$$

* * * * *